(12) United States Patent
Erlacher et al.

(10) Patent No.: US 10,442,473 B2
(45) Date of Patent: Oct. 15, 2019

(54) MOUNTING ARRANGEMENT

(71) Applicant: MAGNA STEYR Fahrzeugtechnik AG & Co KG, Graz (AT)

(72) Inventors: Manuel Erlacher, Radenthein (AT); Franz Planka, St. Andrae (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 117 days.

(21) Appl. No.: 15/598,098

(22) Filed: May 17, 2017

(65) Prior Publication Data

US 2018/0334196 A1   Nov. 22, 2018

(30) Foreign Application Priority Data

Jun. 20, 2016 (EP) .................................. 16175222.5

(51) Int. Cl.

| B62D 27/06 | (2006.01) |
| B62D 21/15 | (2006.01) |
| B62D 25/02 | (2006.01) |
| B60K 1/04 | (2019.01) |
| F16B 5/02 | (2006.01) |
| B62D 25/20 | (2006.01) |

(52) U.S. Cl.
CPC .............. *B62D 27/065* (2013.01); *B60K 1/04* (2013.01); *B62D 21/157* (2013.01); *B62D 25/025* (2013.01); *B62D 25/2009* (2013.01); *F16B 5/02* (2013.01); *B60Y 2306/01* (2013.01)

(58) Field of Classification Search
CPC ........ B60K 1/04; B62D 21/09; B62D 21/155; B62D 21/157; B62D 25/025; B62D 25/20; B62D 25/2009; B62D 27/065
USPC .......................... 296/187.01, 187.08, 187.12
See application file for complete search history.

(56) References Cited

U.S. PATENT DOCUMENTS

| 8,696,051 B2 * | 4/2014 | Charbonneau ....... B62D 21/157 296/187.12 |
| 8,794,646 B1 * | 8/2014 | Onishi ................. B62D 21/155 280/124.109 |
| 9,446,643 B1 * | 9/2016 | Vollmer ............... B62D 21/155 |
| 9,616,931 B2 * | 4/2017 | Sangha ................ B62D 21/155 |
| 9,616,932 B2 * | 4/2017 | Nusier .................. B62D 24/00 |

(Continued)

FOREIGN PATENT DOCUMENTS

| DE | 102010050609 A1 | 6/2011 |
| DE | 102014215513 A1 | 2/2016 |

(Continued)

*Primary Examiner* — Jason S Daniels
(74) *Attorney, Agent, or Firm* — Jordan IP Law, LLC; Todd A. Vaughn

(57) ABSTRACT

A fastening arrangement for a motor vehicle, comprising a component, a load-bearing structural element of the motor vehicle, and at least one fastening device. The component is fastened to the load-bearing structural element of the motor vehicle via the at least one fastening device. The fastening device has a clamping element in which in a normal state the clamping element reinforces the fastening of the component via the fastening device, with the action of an external force the clamping element being automatically transferred into an accident state in which the clamping element loosens the fastening of the component via the fastening device.

19 Claims, 8 Drawing Sheets

(56) References Cited

U.S. PATENT DOCUMENTS

| | | | |
|---|---|---|---|
| 2013/0037337 A1 | 2/2013 | Auer et al. | |
| 2015/0249240 A1* | 9/2015 | Hihara | B60K 1/04 |
| | | | 180/68.5 |
| 2016/0083017 A1* | 3/2016 | Sakaguchi | B62D 21/157 |
| | | | 296/187.12 |
| 2018/0208038 A1* | 7/2018 | Ozawa | B60K 1/04 |
| 2018/0312198 A1* | 11/2018 | Shimizu | B62D 21/155 |

FOREIGN PATENT DOCUMENTS

| | | |
|---|---|---|
| FR | 2961442 A1 | 12/2011 |
| GB | 1445970 A | 8/1976 |
| WO | 2015090684 A1 | 6/2015 |

* cited by examiner

MOUNTING ARRANGEMENT

CROSS-REFERENCE TO RELATED APPLICATIONS

The present application claims priority under 35 U.S.C. § 119 to European Patent Publication EP 16175222.5 (filed on Jun. 20, 2016), which is hereby incorporated by reference in its entirety.

TECHNICAL FIELD

Embodiments relate to a fastening arrangement of a component in a motor vehicle, comprising the component, a load-bearing structural element of the motor vehicle and at least one fastening device, wherein the component is to be fastened to the load-bearing structural element of the motor vehicle via the at least one fastening device.

BACKGROUND

Fastenings of components to a load-bearing structural element of a motor vehicle are necessary and usual for the construction of the motor vehicle as a movable unit. The load-bearing structural elements of the motor vehicle generally form the body thereof. Typically, the fastenings to the body are implemented by screw connections.

In the event of an accident, however, due to the stiffness of the connection, screwed components may cause undesirable block formation and high load peaks for the occupants and damage safety-critical components.

In order to reduce the potential consequences of an accident, different measures have already been proposed.

Thus, for example, DE 10 2012 008 793 A1 discloses a battery for a motor vehicle comprising a housing, wherein at least one load distribution element is arranged on an outer face of the housing, wherein the load distribution element may be configured as a foam element, in particular as structural foam.

DE 10 2011 016 081 A1 discloses a device for receiving a battery comprising a retaining device which is able to be arranged in or on a motor vehicle, wherein the retaining device comprises a number of deformable fastening elements, wherein the fastening elements in each case are spring elements and/or damping elements.

SUMMARY

Embodiments relate to a fastening arrangement of a component in a motor vehicle, which is to reduce the occurrence of load peaks for occupants of the motor vehicle and damage to components of the motor vehicle.

Embodiments relate to a fastening arrangement of a component in a motor vehicle, comprising the component, a load-bearing structural element of the motor vehicle and at least one fastening device. The component is to be fastened to the load-bearing structural element of the motor vehicle via the at least one fastening device. The fastening device has a clamping element, such that in a normal state the clamping element reinforces the fastening of the component via the fastening device. With the action of an external force, i.e., via the energy of the external force, the clamping element is to be automatically transferred into an accident state in which the clamping element reduces or otherwise loosens the fastening of the component via the fastening device.

In accordance with embodiments, a component on a load-bearing structural element, in particular on the vehicle body, is to be fastened to one or more sills. The fastening is to be secured in a normal state, i.e., when an accident situation is not present, since the fastening element is acted upon via a clamping element, which in this normal state is under tension, such that the fastening is sufficiently secured for normal operation of the motor vehicle.

If an accident occurs, in particular, a side impact against the motor vehicle and/or the region of the motor vehicle in which the component is fitted, the clamping element is to be released so that the fastening is loosened via the fastening device. The component is therefore fastened less securely to the load-bearing structure. Advantageously, the fastening device is not damaged, at least in the case of minimal impact energy, so that the fastening per se is also able to remain intact and not be entirely lost.

The case of an accident may result in an uncoupling of the component from the body, and thus, reduced block formation by rigidly connected structural elements, as well as reduced load peaks. In the normal state, however, the component is incorporated into the overall stiffness of the body, whereby savings are able to be made in other body parts and/or said parts are able to be designed to be more lightweight and with reduced stiffness.

In accordance with embodiments, the clamping element may comprise at least one wedge, or particularly, at least two wedges. A wedge may be displaced from its position, in particular, by the action of force from the sides of its acute angle in order to loosen a fastening device reinforced by the wedge. In the normal state, the wedge is held in position by static friction on its side surfaces.

In accordance with embodiments, the clamping element comprises at least two wedges, the side surfaces thereof being superimposed at least in the normal state and being displaced relative to one another with the action of an external force.

In accordance with embodiments, a projecting element is provided, wherein the projecting element has a projection relative to the load-bearing structural element and is connected to a wedge or is integral therewith, so that with the action of the external force from the direction of the projection the projecting element is affected by the action of force before the load-bearing structural element and acts on the wedge. The loosening of the fastening and the uncoupling of the component is to thereby occur before the load-bearing structure is damaged. To this end, the projection is to be arranged on the side of the acute angle of the wedge, so that said wedge may be pushed out of its position in the direction of its elevated portion when the static friction is overcome. The projection may be a separate transmission element, for example a pin, or may be configured integrally with the wedge.

The fastening device may comprise a mechanical connection such as, for example, a screw connection. The clamping element is thus arranged on the screw, in particular, such that the screw penetrates an opening in the clamping element, in particular in the wedge and/or in the wedges.

In accordance with embodiments, the screw connection also has a nut and/or a nut plate.

In accordance with embodiments, the clamping element is arranged between a head of the screw and the nut and/or the nut plate of the screw. In particular, the clamping element may be tensioned between the component and the head or the nut of the screw in the normal state.

In accordance with embodiments, the clamping element has a clearance relative to the fastening device, so that in the accident state of the clamping element a relative movement is permitted between the clamping element and the fastening device. The clearance, in particular, may be achieved by a slot in the wedge and/or in the wedges or by a hole which has a greater diameter than the screw.

In accordance with embodiments, the component has a clearance relative to the fastening device, so that in the accident state of the clamping element a relative movement is permitted between the component and the fastening device. This clearance may also be formed by a slot or over-dimensioned hole in the component for receiving the screw.

In accordance with embodiments, the fastening arrangement comprises at least two fastening devices and at least two clamping elements assigned to the fastening device, wherein the component is fastened to a load-bearing structural element of the motor vehicle via both fastening device, wherein the two clamping elements are connected by a coupling element, so that with the transfer of one of the two clamping elements into the accident state, by the action of an external force, the other clamping element is also automatically transferred into the accident state so that both fastenings are loosened via the fastening device. The load-bearing structural element to which the component is fastened may be the same structural element on both fastening device or even a different load-bearing structural element of the same vehicle, for example the other sill of the motor vehicle. With the occurrence of an accident on one side or one region of the motor vehicle, a further fastening device which is not directly affected may also be loosened by such a coupling element.

In accordance with embodiments, the coupling element may, in particular, comprise a rod, a plate or a cable pull. Coupling elements may also be arranged bi-directionally so that the action of force may be transmitted to the respective other fastening device. The coupling elements may be configured, in particular, as rods which are arranged between the elevated side of a releasing wedge and the acute angle and/or the narrow side of a target wedge.

In accordance with embodiments, a motor vehicle may comprise at least one fastening arrangement as described herein. The load-bearing structural element may, in particular, be a body, such as for example a sill.

In accordance with embodiments, the component which is fastened may be a high voltage battery or another type of energy storage device of the motor vehicle, in particular, a drive battery of an electric or hybrid vehicle or a tank for a liquid or gaseous medium.

DRAWINGS

Embodiments will be illustrated by way of example in the drawings and explained in the description below.

DESCRIPTION

Figure 1:
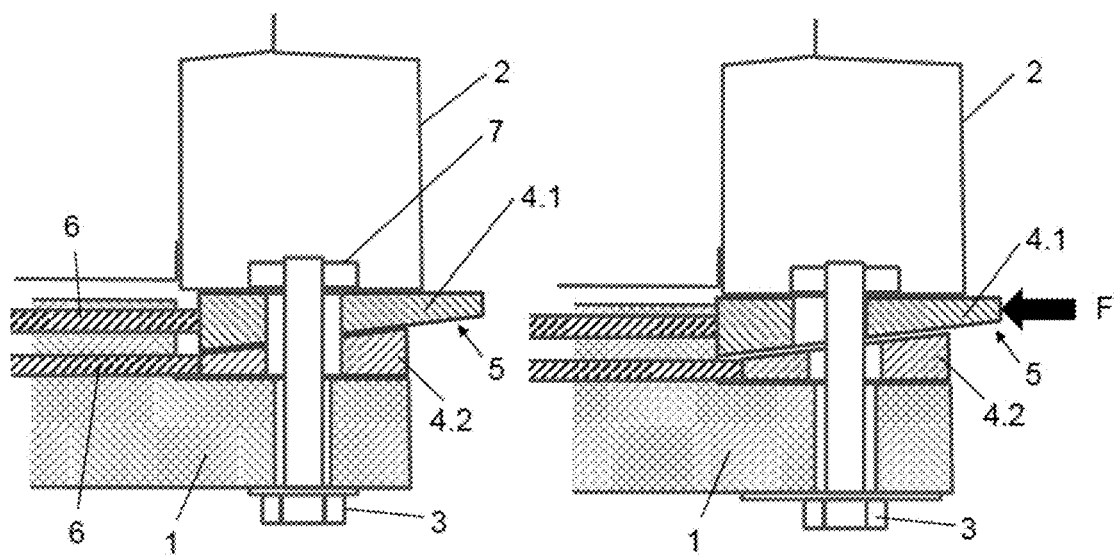
FIG. 1 is a sectional view of a fastening arrangement in a normal state (left) and in an accident state (right) from the side, in accordance with embodiments.

In FIG. 1 a fastening arrangement in accordance with embodiments is shown schematically in a normal state (left-hand illustration) and in an accident state (right-hand illustration).

The fastening arrangement comprises a component 1, namely a drive battery or another type of energy storage device which is fastened in a motor vehicle, namely to a load-bearing structural element 2 of the motor vehicle, such as in particular a sill, via a screw connection as the fastening device 3. The screw connection comprises a screw with a head, wherein the head bears against a surface of the component 1 remote from the sill and, on the other hand, a nut plate 7 which bears against a surface of the sill 2, so that the sill 2 and the battery 1 are pressed against one another, at least in the normal state shown to the left, i.e., a normal operating state of the motor vehicle.

A clamping element 4.1, 4.2 is arranged between a surface of the component 1 facing the load-bearing structural element 2 and the fastening surface of the load-bearing structural element 2. The clamping element 4.1, 4.2 may comprise two wedges, namely an upper wedge 4.1 in FIG. 1 which is arranged adjacent to the load-bearing structural element 2, and a lower wedge 4.2 in FIG. 1 which is arranged adjacent to the component 1. The lateral surfaces of the two wedges in the normal state (left-hand illustration) are superimposed, wherein the elevated portions of the wedges face in opposing directions, namely the elevated portion of the wedge 4.1 to the left and the elevated portion of the wedge 4.2 to the right. With the action of an external force F (right-hand illustration) on the narrow side (side of the acute angle of the wedge) of one of the two wedges, in this case on the wedge 4.1 located at the top, the superimposed side surfaces of the wedges 4.1, 4.2 are displaced relative to one another and thus the two wedges 4.1, 4.2 are released and, in the accident state shown to the right, the fastening of the component 1 on the load-bearing structural element 2 via the screw connection 3 is loosened. On the wedges 4.1, 4.2 and on the component 1 a clearance is provided relative to the screw connection 3, for example by the formation of slots.

In accordance with embodiments, the fastening device does not have to be a screw connection. For example, the fastening device may also be possible to weld a pin as a fastening device to the load-bearing structural element 2 and/or to the component 1 and to brace the component 1 by the clamping elements 4.1 and 4.2 and the load-bearing structural element 2.

So that the loosening of the fastening takes place before a possible deformation of the component 1 and the load-bearing structural element 2, the upper wedge 4.1 has a projecting element 5 which protrudes to the side both relative to the load-bearing structural element 2 and relative to the component 1, so that with a laterally acting force, for example by striking laterally against a post or the like, the loosening mechanism is automatically triggered.

Figure 2:
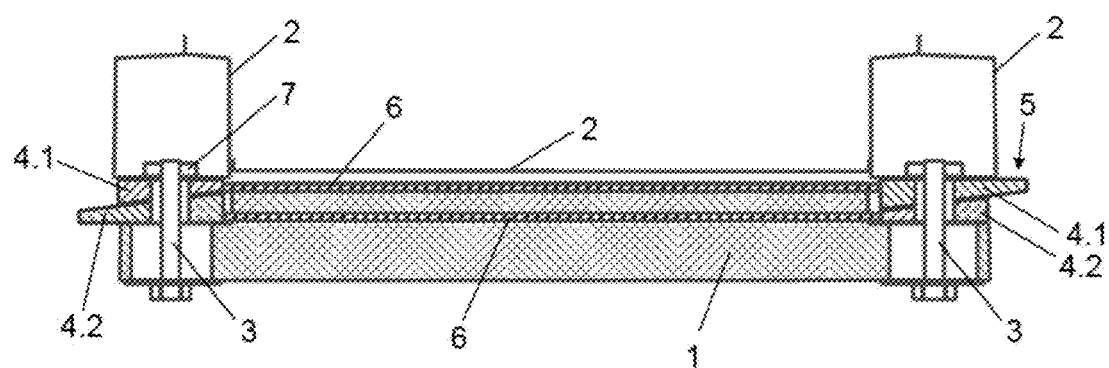
FIG. 2 is a sectional view of a fastening arrangement with two fastening device and coupling elements from the side, in accordance with embodiments.

When the uncoupling is triggered by the lateral displacement of the wedge 4.1, the movement of the wedge 4.1 is transmitted via a coupling element 6, in particular, via a rod in this case, to a further wedge 4.1—shown on the left in FIG. 2—which also is displaced relative to its assigned second wedge 4.2, and as a result loosens a further fastening device 3. The further fastening device 3 may, in particular, represent a fastening of the same component 1 to a sill 2 on the opposing vehicle side. To this end, the elevated portions of the wedges 4.1 located at the top are oriented in the same direction on both fastening device, namely to the left, and thus toward the inside of the motor vehicle on one fastening and toward the outside of the motor vehicle on the opposing second fastening. The elevated portions of the wedges 4.2 respectively arranged below are oriented exactly in reverse, i.e. in each case to the right, and said wedges are connected in turn via a coupling rod 6, so that an externally acting force may be transmitted in both directions. The clamping elements, in particular, the wedges 4.1 and 4.2, may extend over the entire length of the component 1 (in the longitudinal direction of the motor vehicle). This is advantageous, in particular, if coupling rods, in particular narrow coupling rods, are used for transmitting the force.

Figure 3:
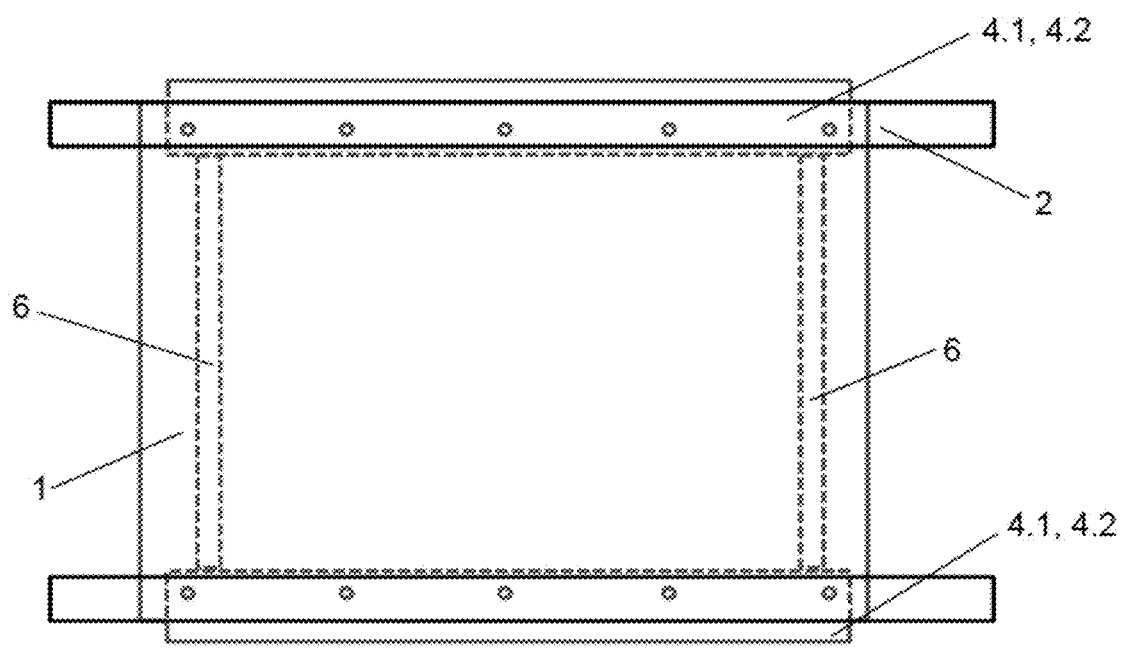
FIG. 3 is a top view of the fastening arrangement of FIG. 2.

FIG. 3 shows the same fastening arrangement in a view from above. At least one of the wedges 4.1, 4.2 has on each vehicle side a projection relative to the load-bearing structural element 2, i.e. the lateral sill of the motor vehicle. The wedges 4.1, 4.2 extend in the longitudinal direction of the motor vehicle over the length of the fastened component 1 or along the entire fastening region of the component 1 for each vehicle side region, in which clamping elements 4.1, 4.2 are provided so that a plurality of screw connections as fastening device 3 are clamped via an individual wedge 4.1 and an individual wedge 4.2. At a front position and a rear position in the direction of travel, transmission rods are provided as coupling elements 6. In FIG. 3 said coupling rods are designed as narrow rods. Whilst not shown in FIG. 3, it might also be possible to provide further additional coupling rods 6, or instead of the separate coupling rods, wider and/or flat coupling elements 6, i.e. coupling plates, which in each case as structural elements are substantially able to cover the entire length of the fastening region for each vehicle side in which clamping elements 4.1 and 4.2 are provided. By the broad design of the clamping elements 4.1, 4.2, of the projecting elements 5 and/or of the coupling elements and/or coupling plates 6, the path thereof substantially extending along the entire respective fastening region on the motor vehicle side in which clamping elements 4.1 and 4.2 are provided, it is ensured that irrespective of the exact position at which for example a post, or in the event of a motor vehicle crash a further vehicle, strikes, a transmission of the force to the opposing side is ensured since, for example, all of the coupling elements/coupling rods 6, which are designed to be strip-shaped and arranged over the width of the component, are activated by the externally acting force F.

Figure 4:
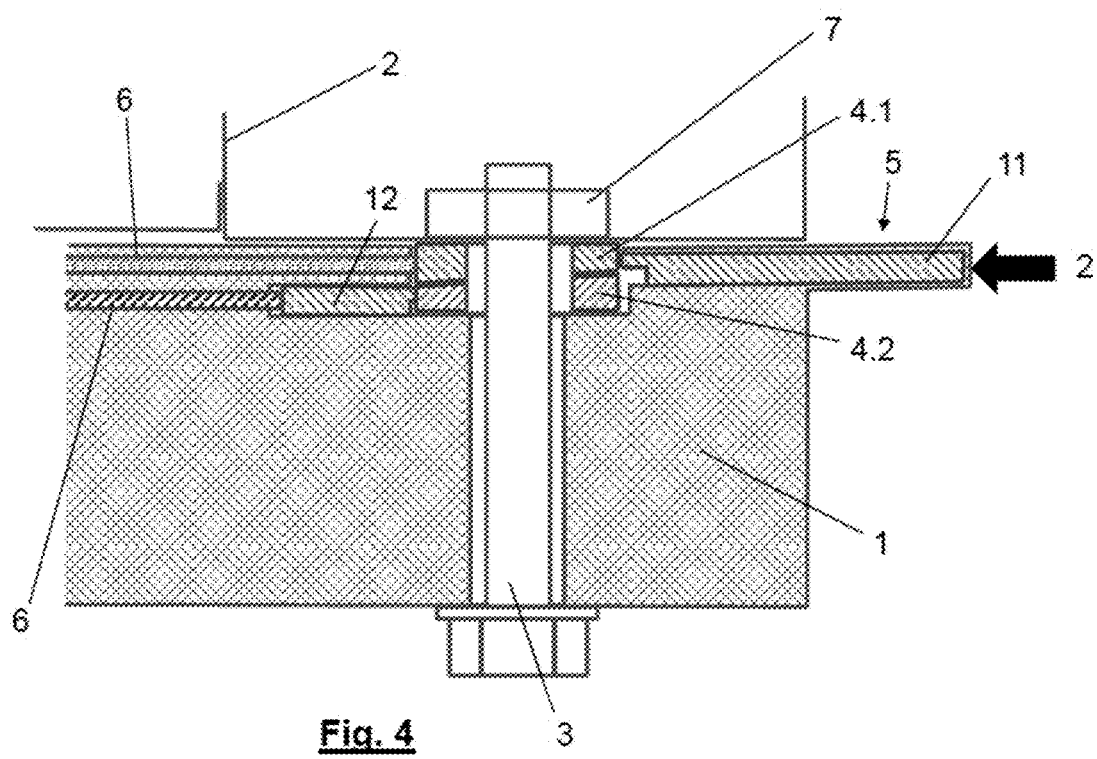
FIG. 4 is a sectional view of a fastening arrangement in a normal state, in accordance with embodiments.

As an alternative to the integral configuration of the projecting element 5 by the wedges 4.1 and 4.2 themselves, as illustrated in FIG. 1 and FIG. 2, FIG. 4 shows an embodiment with a separate external transmission element 11 as a projecting element 5 which, in the event of lateral displacement, acts on the narrow side of the wedge 4.1 and thus displaces the wedge 4.1. Also shown is a separate internal transmission element 11 which is arranged between a clamping element 4.2 and the coupling element 6, i.e. facing the inside of the component 1. As visible in FIG. 4, the clamping element 4.1, 4.2 and the coupling element 6 may also be integrated in the component 1, so that no additional constructional height is required therefor.

In this case, as visible in FIG. 3, the clamping elements 4.1 and 4.2 may once again extend over the entire length of the component 1 and/or substantially along the entire respective fastening region on the motor vehicle side, in each case as a structural element, and likewise the projecting element 5 and/or the transmission element 11, 12. In the case of an impact outside the longitudinal region of the component and/or outside the direct fastening region of the component, in order to effect a release of the fastening 3, the projecting element 5 may also be designed to be longer than the length of the fastening region of the component. However, it might also be possible to design the transmission elements 11, 12 to be narrower and/or in each case to arrange said transmission elements as separate structural elements substantially only in those regions where the respective coupling rods 6 extend and/or come into contact with the clamping elements 4.1, 4.2. This might be particularly expedient if the coupling elements 6 were not designed as narrow rods but as (one) planar structural element which extends as far as possible over the entire length of the fastening region of the component.

Figure 5:
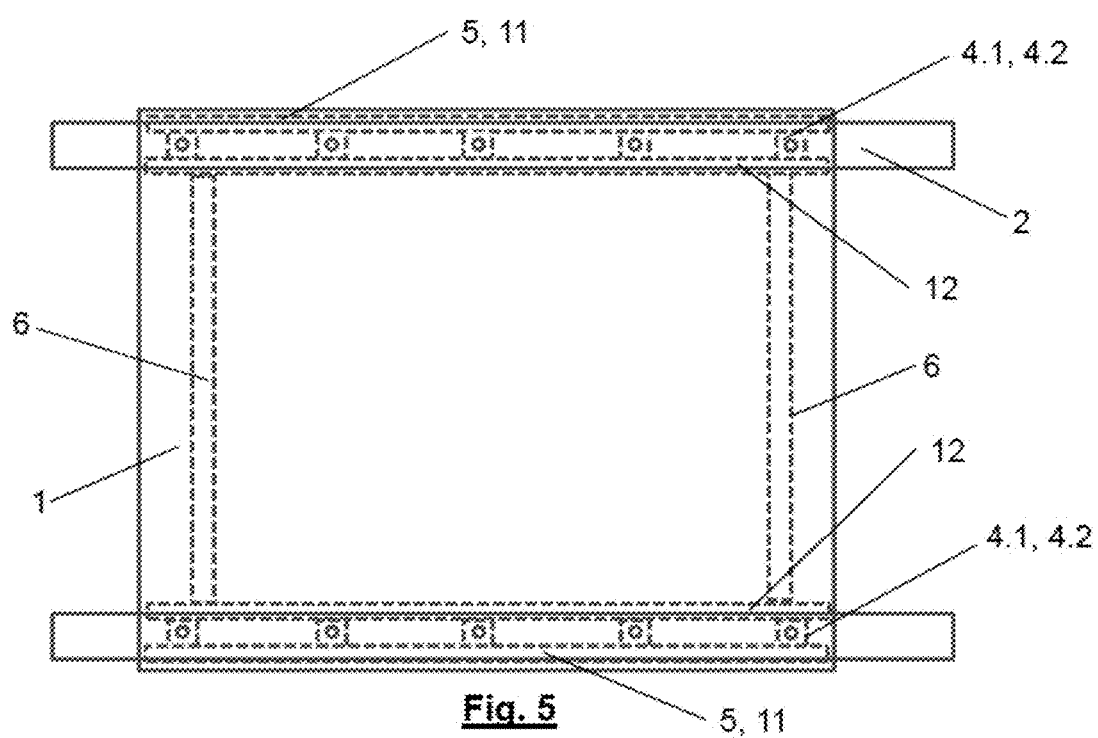
FIG. 5 is a top view of the fastening arrangement of FIG. 4.

In FIG. 5 a further embodiment is visible in which the projecting elements 5 and the transmission elements 11, 12 again extend over the entire length of the component 1 and/or along the entire fastening region, in each case as a structural element, but the clamping elements 4.1 and/or 4.2 in each case are designed to be narrower and in each case a separate clamping element 4.1 and/or 4.2 is designed for each fastening region. As a result, on the one hand, a more selective fastening and, on the other hand, a corresponding saving of weight might be possible. The coupling elements 6 are, in the example of FIG. 8, once again designed as coupling strips and/or coupling rods.

By the broad design of the projecting elements 5 and/or the internal and/or external transmission elements 11, 12, in each case as a structural element, the path thereof substantially extending along the entire respective fastening region on the motor vehicle side in which clamping elements 4.1 and 4.2 are provided, it is ensured that at whatever point of the projecting element 5 a post, or in the event of a motor vehicle crash a further vehicle, strikes, all of the coupling elements/coupling rods 6, which are designed to be strip-shaped and arranged over the width of the component, are activated by the externally acting force F.

Instead of an embodiment of the internal transmission element 12 over substantially the entire length of the fastening region, the internal transmission element 12, for example, may be entirely dispensed with when in each case separate coupling rods 6 adapted to the width of the clamping elements 4.1, 4.2 are present for each individual clamping element 4.1 and/or 4.2 or the individual coupling rods 6 are entirely dispensed with and instead in each case a flat coupling element 6 is present.

Figure 6:
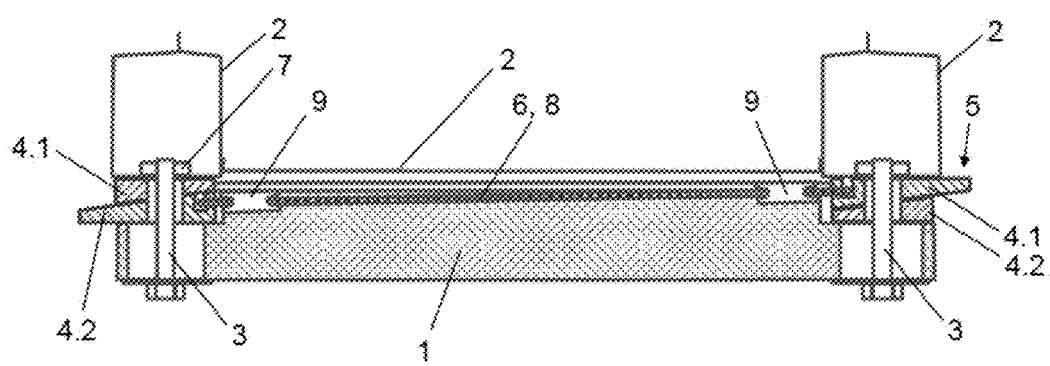
FIG. 6 is a sectional view of a fastening arrangement with two fastening device and the coupling element from the side, in accordance with embodiments.
Figure 7:
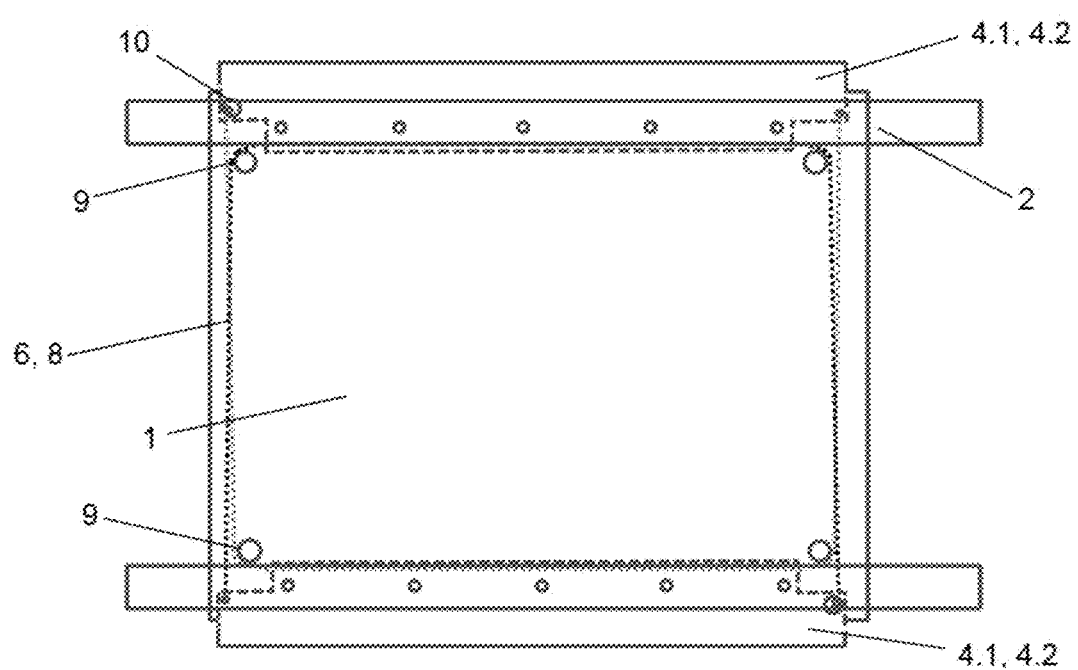
FIG. 7 is a top view of the fastening arrangement of FIG. 5 in a normal state.
Figure 8:
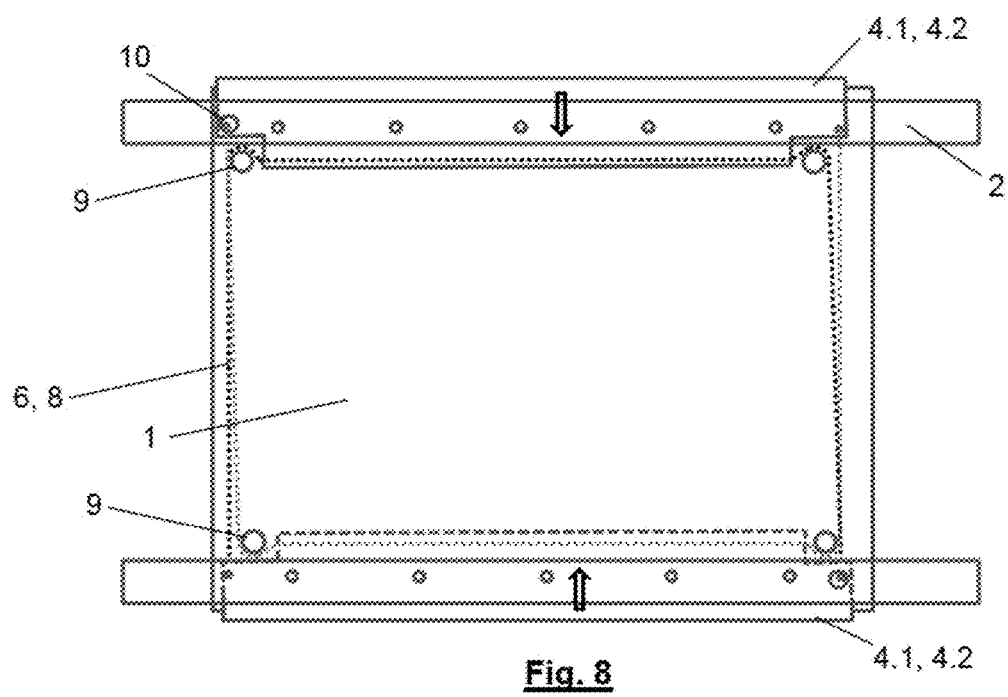
FIG. 8 is a top view of the fastening arrangement of FIG. 5 in an accident state.

FIG. 6 shows a further embodiment of the coupling between a right-hand and a left-hand fastening device 3 in a motor vehicle. A cable pull is used—or a plurality of cable pulls—as a coupling element 6, comprising at least one cable 8—as shown in FIGS. 7 and 8—which may extend in a substantially U-shaped manner or even over the entire periphery of the component 1 and comprise deflection rollers 9 for guiding the cable 8. In particular, two cables which are guided in a U-shaped manner may be used, said cables being inverted relative to one another as shown in FIGS. 7 and 8.

FIG. 7 shows the state of the cable 8 in the normal state, i.e. with the tensioned clamping elements 4.1, 4.2. FIG. 8 shows the same fastening arrangement in the accident state, i.e. with the clamping elements 4.1, 4.2 loosened, wherein the wedges 4.1 and 4.2 are displaced inwardly (direction of the arrow) relative to the load-bearing structural element 2 and, as a result, tension a cable 8 which is guided on the wedges 4.1, 4.2 and thus also pull the wedge 4.1, 4.2 of the opposing vehicle side inwards. Such a coupling via a cable pull may comprise one or more tensioning devices 10 for the cables 8.

As a whole, in accordance with embodiments, a component 1, in this case a battery block, is screwed to a body 2 via a plurality of screw points 3. A clamping element based on wedges 4.1, 4.2 is screwed thereto between the body 2 and the component 1. The clamping element preferably comprises two or more wedges 4.1, 4.2 which do not slip relative to one another in a normal state, due to the surface characteristic thereof or a suitable shape. Only by a specific loading via an externally acting force F, for example by a post or another obstruction, is the surface friction of the wedges 4.1, 4.2 overcome and the screw connection 3 loosened. As a result, the component 1 is able to move over a specific region in one direction, for example via a slot in the component 1 or a nut which slides and/or breaks off in the sill 2. Via a coupling element 6, in particular via push rods and/or via a cable mechanism, the second and/or opposing screw point side is then loosened.

The term "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Component
2 Load-bearing structural element
3 Fastening device
4.1 Clamping element, upper wedge
4.2 Clamping element, lower wedge
5 Projecting element
6 Coupling element
7 Nut plate
8 Cable
9 Deflection roller
10 Clamping device
11 External transmission element
12 Internal transmission element
F External force

What is claimed is:

1. A fastening arrangement for a motor vehicle, comprising:
a component;
a load-bearing structural element of the motor vehicle; and
a fastening device to fasten the component to the load-bearing structural element, the fastening device including a clamping element having a projection element, a first wedge arranged adjacent to the load-bearing structural element, and a second wedge arranged adjacent to the component, the clamping element being automatically moveable from a normal operating state, in which the clamping element is to reinforce the fastening of the component to the load-bearing structural element, to an accident state in which the clamping element is to loosen the fastening of the component to the load-bearing structural element by transmission of an external force, caused via an impact to the motor vehicle, from the projecting element to the first wedge which thereby laterally displaces the first wedge relative to the second wedge, or from the projecting element to the second wedge which thereby laterally displaces the second wedge relative to the first wedge,
wherein the projecting element has projection relative to the load-bearing structural element and is connected to the first wedge or the second wedge, or is integral with the first wedge or the second wedge, so that with action of the external force from the direction of the projection, the projecting element is affected by the action of force before the load-bearing structural element and acts on the first wedge or the second wedge.

2. The fastening arrangement of claim 1, wherein respective side surfaces of the first wedge and the second wedge are to be superimposed in at least the normal operating state, and displaced relative to one another in the accident state.

3. The fastening arrangement of claim 1, wherein the fastening device comprises a screw connection.

4. The fastening arrangement of claim 3, wherein the screw connection comprises a screw with a head that is to bear against a surface of the component, and a nut plate which is to bear against a surface of the load-bearing structural element in the normal operating state.

5. The fastening arrangement of claim 1, wherein the clamping element has a clearance relative to the at least one fastening device, so that in the accident state of the clamping element, a relative movement is to be permitted between the clamping element and the at least one fastening device.

6. The fastening arrangement of claim 1, wherein the component has a clearance relative to the fastening device, so that in the accident state of the clamping element, a relative movement is to be permitted between the component and the least one fastening device.

7. A fastening arrangement for a motor vehicle, comprising:
a component;
a load-bearing structural element of the motor vehicle;
a first fastening device and a second fastening device arranged spaced apart from each other to separately fasten the component to the load-bearing structural element, the first fastening device and the second fastening device each including a a project element and a clamping element being automatically moveable from a normal operating state, in which each clamping element is to reinforce the fastening of the component to the load-bearing structural element, to an accident state in which each clamping element is to uncouple the fastening of the component to the load-bearing structural element by lateral displacement of each clamping element by an external force, caused via an impact to the motor vehicle, from the projecting element action thereon, wherein the projecting element has a projection relative to the load-bearing structural element and is connected to the clamping element or is integral with the clamping element, so that with action of the external force from the direction of the projection, the projecting element is affected by the action of force before the load-bearing structural element and acts on the clamping element; and a coupling element extending between the first fastening device and the second fastening device such that, the lateral displacement of the clamping element of the first fastening device against the coupling element when automatically moved into the accident state, automatically causes the coupling element to laterally displace the clamping element of the second fastening device, and vice-a-versa, to thereby loosen the fastening of the component to the load-bearing structural element.

8. The fastening arrangement of claim 7, wherein the first fastening device and the second fastening device respectively comprise a screw connection.

9. The fastening arrangement of claim 8, wherein the screw connection comprises a screw with a head that is to bear against a surface of the component, and a nut plate which is to bear against a surface of the load-bearing structural element in the normal operating state.

10. The fastening arrangement of claim 7, wherein the clamping element has a clearance relative to a corresponding one of the first fastening device and the second fastening device, so that in the accident state of the clamping element, a relative movement is to be permitted between the clamping element and the corresponding one of the first fastening device and the second fastening device.

11. The fastening arrangement of claim 7, wherein the component has a clearance relative to the first fastening device and the second fastening device, so that in the accident state of the clamping element, a relative movement is to be permitted between the component and the first fastening device and the second fastening device.

12. The fastening arrangement of claim 7, wherein the coupling element comprises of one a rod, a plate, or a cable pull.

13. The fastening arrangement of claim 7, wherein at least one of the clamping element and the coupling element is to extend in a longitudinal direction of the motor vehicle along an entire respective fastening region of the motor vehicle in which the clamping element is arranged.

14. A fastening arrangement for a motor vehicle, comprising:
a component;
a load-bearing structural element of the motor vehicle; and
a fastening device to fasten the component to the load-bearing structural element, the fastening device including a clamping element arranged between the load-bearing structural element and the component, the clamping element having a first wedge arranged adjacent to the load-bearing structural element, and a second wedge arranged adjacent to the component, and an external transmission element, the clamping element being automatically moveable from a normal operating state, in which the clamping element is to reinforce the fastening of the component to the load-bearing structural element, to an accident state in which the clamping element is to loosen the fastening of the component to the load-bearing structural element by transmission of an external force, caused via an impact to the motor vehicle, from the external transmission element to the clamping element to thereby laterally displace the clamping element relative to the fastening device, wherein the external transmission element is configured such that with action of the external force from the direction of the external transmission element, the external transmission element is affected by the action of force before the load-bearing structural element and acts on the first wedge.

15. The fastening arrangement of claim 14, further comprising a second fastening device, arranged spaced apart from the fastening device, to fasten the component to the load-bearing structural element at a second region of the motor vehicle.

16. The fastening arrangement of claim 15, wherein the second fastening device comprises a second clamping element arranged between the load-bearing structural element and the component, and a second external transmission element.

17. The fastening arrangement of claim 16, wherein the second clamping element is automatically moveable from a normal operating state, in which the second clamping element is to reinforce the fastening of the component to the load-bearing structural element, to an accident state in which the second clamping element is to loosen the fastening of the component to the load-bearing structural element by transmission of an external force, caused via an impact to the motor vehicle, from the second external transmission element to the second clamping element to thereby laterally displace the second clamping element relative to the second fastening device.

18. The fastening arrangement of claim 17, further comprising a coupling element extending between the fastening device and the second fastening device to automatically move the second coupling element into the accident state upon movement of the first coupling element into the accident state, and vice-a-versa.

19. The fastening arrangement of claim 17, further comprising a coupling element connected to the fastening device and the second fastening device to automatically move the second coupling element into the accident state upon movement of the first coupling element into the accident state, and vice-a-versa.

* * * * *